(12) United States Patent
Weaver

(10) Patent No.: US 11,746,675 B2
(45) Date of Patent: Sep. 5, 2023

(54) VANE RING ASSEMBLY FOR A GAS TURBINE ENGINE WITH DEDICATED THROUGH-FLOW VANES

(71) Applicant: Rolls-Royce Corporation, Indianapolis, IN (US)

(72) Inventor: John Weaver, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 0 days.

(21) Appl. No.: 17/533,419

(22) Filed: Nov. 23, 2021

(65) Prior Publication Data

US 2023/0160318 A1 May 25, 2023

(51) Int. Cl.
*F01D 25/12* (2006.01)
*F01D 9/04* (2006.01)
*F02C 7/18* (2006.01)

(52) U.S. Cl.
CPC ............ *F01D 25/12* (2013.01); *F01D 9/041* (2013.01); *F02C 7/18* (2013.01); *F05D 2220/32* (2013.01); *F05D 2240/12* (2013.01); *F05D 2260/201* (2013.01)

(58) Field of Classification Search
CPC .......... F01D 5/189; F01D 5/187; F01D 5/186; F01D 25/12; F01D 5/188; F01D 5/081; F01D 5/082; F01D 9/02; F01D 11/001; F01D 5/181; F01D 25/08; F01D 5/088; F01D 5/18; F01D 9/041; F05D 2220/32; F05D 2260/201; F05D 2260/202; F05D 2240/81; F05D 2240/12; F05D 2260/20; F05D 2250/185; F05D 2240/127; F05D 2240/122; F05D 2240/121; F05D 2260/205; F05D 2240/126; F05D 2240/304; F05D 2250/183; F02C 7/18

See application file for complete search history.

(56) References Cited

U.S. PATENT DOCUMENTS

| | | | |
|---|---|---|---|
| 2,961,150 A | 11/1960 | Pirtle et al. | |
| 7,575,414 B2* | 8/2009 | Lee | F01D 5/187 |
| | | | 415/115 |
| 7,785,072 B1 | 8/2010 | Liang | |
| 8,079,803 B2 | 12/2011 | Takamura et al. | |
| 8,172,504 B2 | 5/2012 | Flodman et al. | |
| 8,371,812 B2 | 2/2013 | Manteiga et al. | |
| 8,408,866 B2 | 4/2013 | Weaver et al. | |
| 9,416,661 B2 | 8/2016 | Benkler et al. | |
| 9,840,930 B2 | 12/2017 | Lee et al. | |
| 10,012,106 B2 | 7/2018 | Spangler et al. | |
| 10,450,881 B2 | 10/2019 | Mugglestone | |
| 10,480,328 B2 | 10/2019 | Weaver et al. | |
| 10,633,996 B2 | 4/2020 | Barker et al. | |
| 10,655,482 B2 | 5/2020 | Freeman et al. | |
| 10,767,493 B2* | 9/2020 | Whittle | F01D 9/041 |
| 2004/0170498 A1 | 3/2004 | Peterman et al. | |
| 2009/0010751 A1 | 1/2009 | McCaffrey et al. | |

\* cited by examiner

*Primary Examiner* — Eric J Zamora Alvarez
(74) *Attorney, Agent, or Firm* — Barnes & Thornburg LLP

(57) ABSTRACT

A vane ring assembly adapted for use in a gas turbine engine includes an airfoil set, an outer band, and an inner band. The airfoil set extends radially across a primary flow path annulus arranged around an axis. The outer band extends around the airfoil set. The inner band extends around the axis at the airfoil set.

19 Claims, 5 Drawing Sheets

VANE RING ASSEMBLY FOR A GAS TURBINE ENGINE WITH DEDICATED THROUGH-FLOW VANES

FIELD OF THE DISCLOSURE

The present disclosure relates generally to gas turbine engines, and more specifically to directing airflow through the turbine section of a gas turbine engine. Further, it relates to directing cooling air through vane rings in the turbine section of a gas turbine engine.

BACKGROUND

Gas turbine engines are used to power aircraft, watercraft, generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is performed to drive the compressor and, sometimes, an output shaft. Left-over products of the combustion are exhausted out of the turbine at high temperatures and may provide thrust in some applications.

Compressors and turbines typically include alternating stages of static vane ring assemblies and multiple rotating wheel assemblies. Each static vane ring assembly provides structural mounting, transmits reaction loads, and contains a radially disposed set of airfoils designed to channel combustion gases through the primary flow path annulus into the turbine blades which extract energy from the flow.

SUMMARY

The present disclosure may comprise one or more of the following features or combinations thereof.

According to one aspect of the present disclosure, a vane ring assembly adapted for use in a gas turbine engine includes an airfoil set, an outer band, and an inner band. The airfoil set extends radially across a primary flow path annulus arranged around a central reference axis. The outer band extends around the airfoil set to define a radially-outer boundary of the primary flow path annulus. The inner band extends around the central reference axis at the airfoil set to define a radially-inner boundary of the primary flow path annulus. The inner band is shaped to block the in-flow cooling air in the in-flow internal cavities from moving radially-inward of the primary flow path annulus.

In some embodiments, the airfoil set may include a plurality of in-flow vanes. Each of the in-flow vanes may have an in-flow transfer passage configured to receive the in-flow cooling air from a radially-outwardly opening in-flow aperture. The in-flow transfer passage may discharge cooling air into the primary flow path annulus via cooling holes formed on an exterior surface of the in-flow vanes to cool the in-flow vanes.

In some embodiments, the airfoil set may further include a plurality of through-flow vanes. Each of the through-flow vanes may have a through-flow transfer passage configured to receive through-flow cooling air from a radially-outwardly opening through-flow aperture. The through-flow vanes may discharge at least some of the through-flow cooling air radially inwardly of the primary flow path annulus into an air feed passage, cooling the through-flow vane. The air feed passage may cool other components of the gas turbine engine axially forward or aft of the vane ring assembly or may prevent primary hot gas ingestion.

In some embodiments, the outer band may be formed to define the in-flow apertures from which the in-flow internal cavities of the in-flow vanes receive the in-flow cooling air. The outer band may be formed to include the through-flow aperture through which the through-flow internal cavities of the through-flow vanes receive the through-flow cooling air. In some embodiments, the in-flow vane and through-flow vane may be integrated into a one-piece monolithic component.

In some embodiments, the inner band may cause all cooling air received by the in-flow internal cavities of the in-flow vanes to be discharged into the primary flow path annulus. The inner band may be formed to define a plurality of purge air metering orifices. Each of the purge air metering orifices may be located in fluid communication with a corresponding through-flow transfer passage of one of the through-flow vanes. The purge air metering orifices may be shaped so that at least some of the cooling air received by the through-flow internal cavities of the through-flow vanes is discharged radially-inwardly of the primary flow path annulus. The purge air may be delivered to other components upstream or downstream of the vane ring assembly. This may allow the cooling air to be re-used to cool the components or prevent primary hot gas ingestion after passage through the plurality of through-flow vanes.

In some embodiments, the in-flow transfer passage of the in-flow vane may be formed to include a plurality of turbulators. Each of the turbulators are arranged on a surface of the in-flow transfer passage in contact with the in-flow cooling air. The turbulators may be configured to cause heat transfer by inducement of turbulent air flow over the surface contacting the in-flow cooling air.

In some embodiments, the through-flow transfer passage of the through-flow vanes may have, on a surface contacting the through-flow cooling, air a plurality of turbulators. The numerical number of total cooling features may be fewer than the numerical total of cooling features disposed on any surface in contact with the in-flow air within the in-flow transfer passage. In some embodiments, the through-flow transfer passage of the through-flow vanes may be free of turbulators on all surfaces contacting the through-flow cooling air.

In some embodiments, the trailing edge of the through-flow vanes may be formed to include cooling holes. In some embodiments, the trailing edge of the through-flow vanes may be formed without the cooling holes.

In some embodiments, at least part of the trailing edges may be composed of a solid or hollow first material distinct. The first material may be distinct from a second material forming the remainder of the through-flow vane. The second material may be able to withstand, without degradation in structure or shape, temperatures in excess of those withstood by the second material from which the remainder of the through-flow vanes are composed. In some embodiments, the first material of the trailing edges of the through-flow vanes may be formed of a ceramic matrix composite material.

In some embodiments, the vane ring seal assembly may further include a seal. The seal may be located radially inward of the inner band.

In some embodiments, the seal may be configured to partition an upstream air feed passage in fluid communication with components upstream of the vane ring assembly.

The seal may partition a second downstream air feed passage in fluid communication with components downstream of the vane ring assembly.

In some embodiments, the vane ring assembly may further include a plurality of purge air metering orifices on the inner band. Each of the purge air metering orifices may be shaped to distribute through-flow cooling air at preselected levels between the upstream air feed passage and the downstream air feed passage.

In some embodiments, the vane ring assembly may include at least one purge air metering orifice on the inner band. At least one purge air metering orifice may be shaped to regulate volume of through-flow cooling air conducted through the through-flow vanes.

According to another aspect of the present disclosure, a vane ring assembly adapted for use in a gas turbine engine includes a plurality of in-flow vanes and a plurality of through-flow vanes. The in-flow vanes extend radially across a primary flow path annulus and are arranged around a central reference axis. The plurality of through-flow vanes may extend radially across the primary flow path annulus. The plurality of through-flow vanes may be interspersed among the plurality of in-flow vanes around the central reference axis.

In some embodiments, the plurality of in-flow vanes may have an in-flow transfer passage. The in-flow transfer passage may be configured to receive in-flow cooling air from a radially-outwardly opening in-flow aperture. The in-flow transfer passage may discharge the cooling air into the primary flow path annulus via cooling holes. The cooling holes may be formed at a trailing edge of the in-flow vanes to cool the in-flow vanes.

In some embodiments, the plurality of through-flow vanes may each have a through-flow transfer passage. The through-flow transfer passage may be configured to receive through-flow cooling air from a radially-outwardly opening through-flow aperture. The through-flow transfer passage may discharge at least some of the through-flow cooling air radially inwardly of the primary flow path annulus. This discharge may cool the through-flow vanes and other components of the gas turbine engine axially forward or aft of the vane ring assembly. The discharge may also prevent primary hot gas ingestion.

In some embodiments, the in-flow transfer passage of the in-flow vanes may have, on a surface contacting the in-flow cooling air, a plurality of turbulators. The turbulators may be configured to cause heat transfer by inducement of turbulent air flow over the surface contacting the in-flow cooling air.

In some embodiments, the through-flow transfer passage of the through-flow vanes may have, on a surface contacting the through-flow cooling air, a plurality of turbulators. The numerical number of total turbulators may be fewer than the numerical total of turbulators disposed on any surface in contact with the in-flow air within the in-flow transfer passage. The through-flow transfer passage of the through-flow vanes may be free of turbulators on all surfaces contacting the through-flow cooling air.

In some embodiments, the trailing edge of the through-flow vanes may be formed to include cooling holes. In some embodiments, the trailing edge of the through-flow vanes may be formed without the cooling holes.

In some embodiments, at least part of the trailing edges may be composed of a solid or hollow first material. A second material may form the remainder of the through-flow vane. The first material may be able to withstand, without degradation in structure or shape, temperatures in excess of those withstood by the second material. The first material of the trailing edges of the through-flow vanes may be formed of a ceramic matrix composite.

In some embodiments, the through-flow vanes may further include one or more purge air metering orifices. Each of the purge air metering orifices may be sized to control air that moves radially inwardly of the primary flow path annulus.

In some embodiments, the purge air may move in an upstream air feed passage, in fluid communication with components upstream of the vane ring assembly. In some embodiments, the purge air may move in a downstream air feed passage, in fluid communication with components downstream of the vane ring assembly.

In some embodiments, the in-flow vane and through-flow vane may be integrated into a one-piece monolithic component.

These and other features of the present disclosure will become more apparent from the following description of the illustrative embodiments.

DETAILED DESCRIPTION

Figure 1:
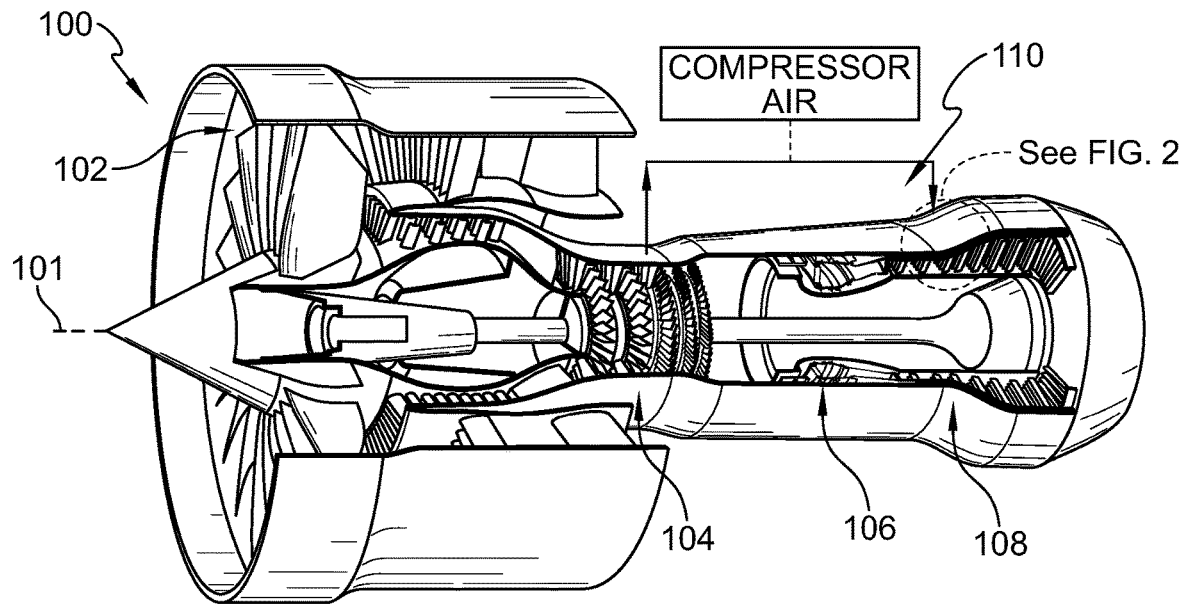
FIG. 1 is a cut-away perspective view of a gas turbine engine showing that a typical engine includes a fan driven by an engine core having a compressor, a combustor, and a turbine and suggesting the turbine includes a plurality of rotationally fixed vane ring assemblies which are partially illustrated in FIG. 2.

For the purposes of promoting an understanding of the principles of the disclosure, reference will now be made to a number of the embodiments illustrated in the drawings and specific language will be used to describe the same.

An illustrative gas turbine engine 100 includes a fan 102, a compressor 104, a combustor 106 and a turbine 108 as shown in FIG. 1. The turbine 108 receives hot expanding gases from the combustor 106 and extracts energy therefrom to drive the fan 102 in order to provide thrust to propel an aircraft. In other embodiments, the compressor 104, the combustor 106, and the turbine 108 provide an engine core 110 that can power a turbo shaft configured for aerospace power generation or other applications.

Figure 2:
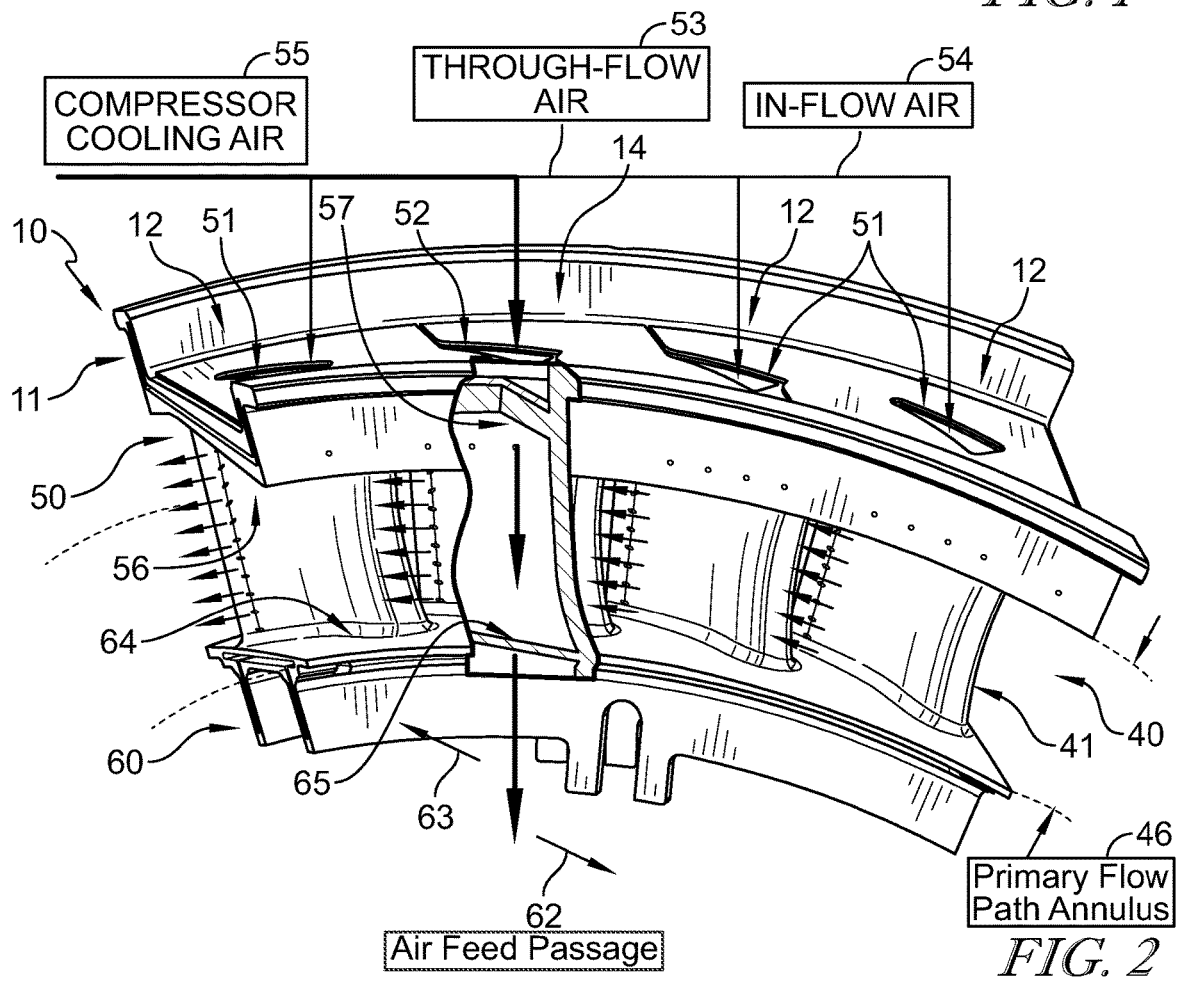
FIG. 2 is a cutaway perspective view of a vane ring segment adapted for inclusion in the turbine section indicated in FIG. 1 showing that the vane ring segment includes two distinct vane types: a through-flow vane, which allows through-flow cooling air to flow radially through it into an air feed passage, and an in-flow vane, which transmits no flow to the air feed passage, but which ejects in-flow cooling air into a primary flow path annulus.

A vane ring assembly 10 providing part of the turbine 108 of the gas turbine engine 100 is shown, in part, in FIG. 2. The vane ring assembly 10 includes an in-flow vane 12 and a through-flow vane 14 as shown in FIG. 2. The in-flow vane 12 includes an in-flow airfoil 41, an in-flow outer platform 56, and an in-flow inner platform 64 as shown in FIG. 2. The through-flow vane 14 includes a through-flow airfoil 42, a through-flow outer platform 57, and a through-flow inner platform 65 as shown in FIG. 2.

The vane ring assembly 10 is illustratively made up of multiple segments 11 arranged adjacent to one another around a central axis 101 to form a ring as suggested in FIG. 1 and FIG. 2. In the exemplary construction, three in-flow vanes 12 and one through-flow vane 14 are integrated into a single cast component or "quad," as shown in FIG. 2. When the segments 11 are assembled, the full hoop of the vane ring assembly 10 includes an inner band 60, an outer band 50, and an airfoil set 40.

Figure 4:
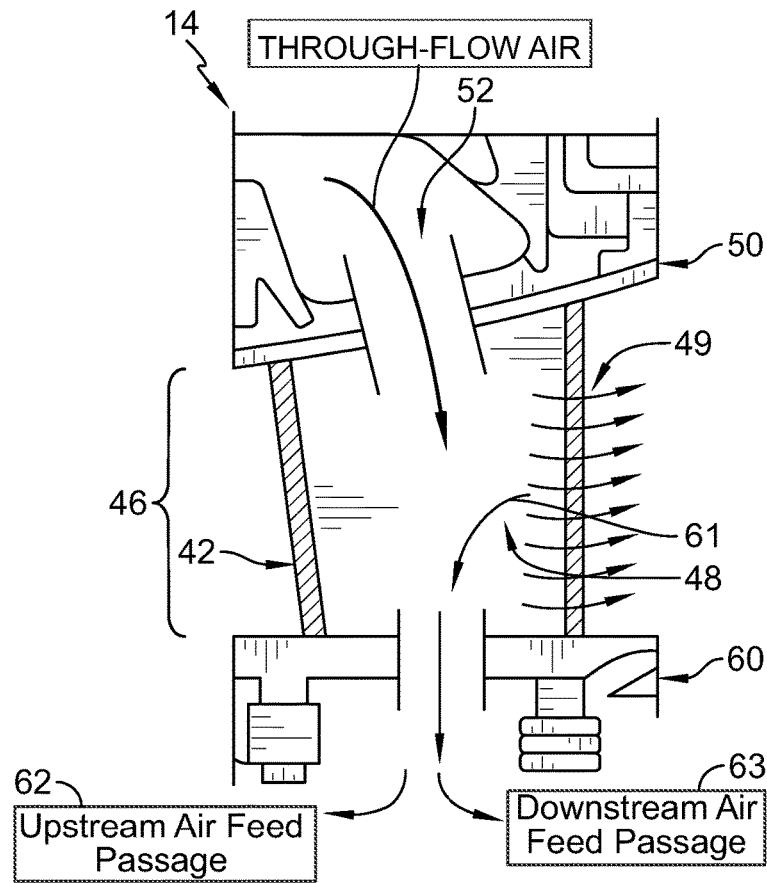
FIG. 4 is a cross-sectional view of the through-flow vane type depicted in FIG. 2 showing both through-flow cooling air optionally ejected into the primary flow path annulus at the trailing edge of a through-flow vane, and through-flow cooling air discharged into the air feed passage radially-inward of the through-flow vane.
Figure 5:
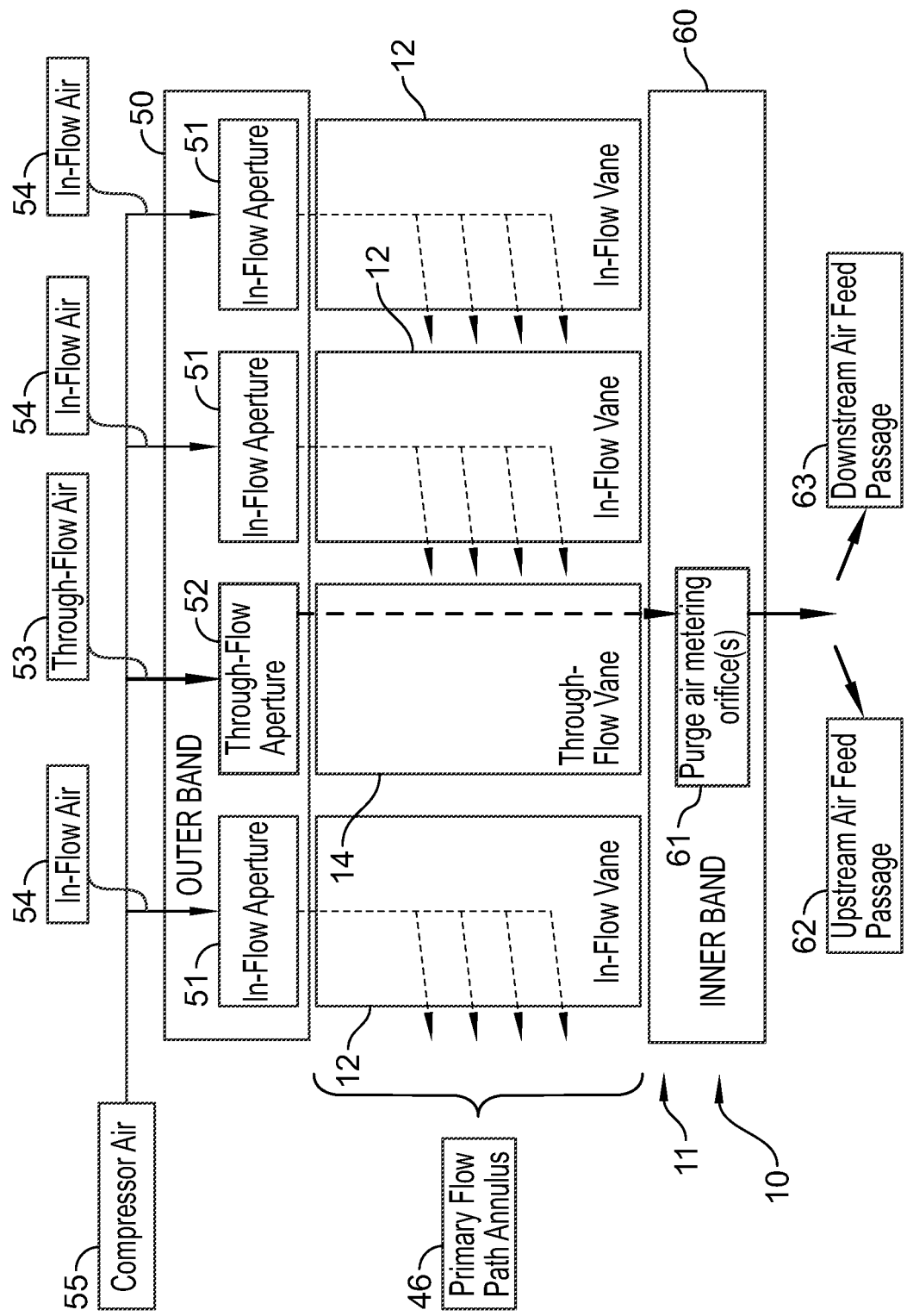
FIG. 5 is a diagrammatic view showing the through-flow air entering the through-flow aperture of the outer band and being transmitted via the through-flow transfer passage through a purge air metering orifice so that the through flow air cools the through-flow vane and is ejected into the air feed passage while in-flow air enters the in-flow aperture of the outer band and is directed for cooling of the in-flow vane before being ejected into the primary flow path annulus.

In one embodiment, the inner band 60 includes a continuous structural material surface interspersed with purge air metering orifices 61 formed to align with, or be integral to, the through-flow inner platform 65 of the through-flow vane 14 as shown in FIG. 4. The inner band 60 may be formed to include the purge air metering orifices 61 at regular or symmetric intervals or the patterns may be diverse as long as each corresponds in axial and circumferential placement to the through-flow vanes 14 as shown in FIG. 2. The inner band 60 is formed to define at least part of a radially-inner boundary of a flow path annulus 46 by combining the continuous structural material surface with a series of in-flow inner platforms 64, through-flow inner platforms 65. The continuous structural material surface forming the radially-inner boundary of the flow path annulus may be formed of the same monolithic material via a casting or subtractive machining process. The inner band 60 also forms at least part of a radially-outer boundary to an upstream air feed passage 62 and a downstream air feed passage 63, as shown in FIG. 4 and FIG. 5. The upstream air feed passage 62 and the downstream inner feed passage 63 each deliver cooling air to respective components in their flow paths, as shown in FIG. 5.

The outer band 50 is formed to include in-flow apertures 51 and through-flow apertures 52 at regular or symmetric intervals corresponding to placement of in-flow vanes 12 and through-flow vanes 14, respectively, as shown in FIG. 2. The outer band 50 is formed to define at least part of a radially-outer boundary of the primary flow path annulus by circumferentially combining a series of in-flow outer platforms 56 and through-flow outer platforms 57 each adjacent to either platform type, substantially continuous and optionally formed of the same monolithic material via casting or subtractive manufacturing. The outer band 50 may form at least part of a radially-outer boundary to compressor cooling air 55 in two optionally distinct paths, through-flow air 53 and in-flow air 54, as shown in FIG. 2 and FIG. 5.

Figure 3:
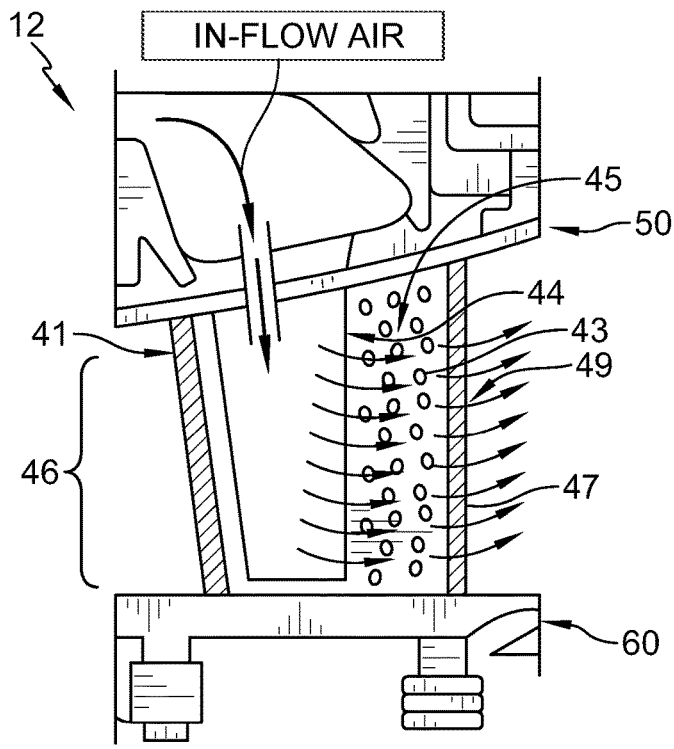
FIG. 3 is a cross-sectional view of the in-flow vane type depicted in FIG. 2 having heat transfer augmenting features (e.g., impingement jets and pins, or vortex generators, dimples, turbulators, etc.) disposed on an inner surface of the in-flow transfer passage showing in-flow cooling air ejected only into the primary flow path annulus.

The airfoil set 40 includes in-flow airfoils 41 and through-flow airfoils 42 fixedly attached to both the inner band 60 and the outer band 50 and extending radially there between, as shown in FIG. 3 and FIG. 4, respectively. For purposes of this disclosure, the structure extending between the inner band 60 and outer band 50 is regarded as the airfoil belonging to each vane type. One embodiment of the in-flow airfoil type includes turbulators 43 on a surface of an in-flow transfer passage 45 contacting the in-flow air 54 as shown in FIG. 3. This embodiment of the in-flow vane 12 also utilizes an impingement tube 44 to diffuse in-flow air 54 throughout an in-flow transfer passage 45, as shown in FIG. 3.

The in-flow transfer passage 45 transmits air from the in-flow aperture 51 to the primary flow path annulus 46, as shown in FIG. 3 and FIG. 4. In this embodiment, the in-flow airfoil 41 has a series of cooling holes 49 to inject in-flow air 54 into the primary flow path annulus 46 from any surface pores forming a film row on an exterior of the in-flow airfoil 41 or at the trailing edge 47 of the in-flow airfoil 41, as shown in FIG. 3. This injection of in-flow air 54 cools the thin structure at the trailing edge 47 of the in-flow airfoil 41 and produces a film of cooling air to insulate the trailing edge 47 from combustion gases otherwise capable of melting the material of the in-flow airfoil 41, as shown in FIG. 3.

The turbulators 43 constitute any surface deformation or structures inserted into flow paths, such as pin fins, fins, bumps, or the like and may be referred to interchangeably as cooling features. These features act to interrupt the boundary layer and promote mixing of the cooling flow. This flow structure enhances heat transfer and consequent cooling of the surfaces contacting the in-flow air. The turbulators 43 also function to increase the surface area available for heat transfer.

The through-flow airfoils 42 include a through-flow transfer passage 48, as shown in FIG. 4. The through-flow transfer passage 48 transmits through-flow air 53 from the through-flow apertures 52 to both the upstream air feed passage 62 and the downstream air feed passage 63 through the purge air metering orifices 61, as shown in FIG. 4.

The purge air metering orifices 61 are designed to ensure that the thermal expansion characteristics in the through-flow vanes 14 are suitable for the material properties thereof during every operational state of the gas turbine engine. In this embodiment, the through-flow airfoil 42 has a series of cooling holes 49 to inject only a portion of the through-flow air 53 into the primary flow path annulus 46 at the trailing edge 47 of the through-flow airfoil 42, as shown in FIG. 4. This injection of in-flow air 54 cools the thin structure at the trailing edge 47 of the through-flow airfoil 42 and produces a film of cooling air to insulate the through-flow airfoil 42, as shown in FIG. 4.

The in-flow air 54 and the through-flow air 53 may be similar in temperature, possibly bled from the same location on the compressor 104. The volumetric majority of the through-flow air 53 continues through the through-flow transfer passage 48 into the upstream air feed passage 62 and the downstream air feed passage 63, as shown in FIG. 4. In contrast, the entirety of the in-flow air 54 is injected into the primary flow path annulus 46, as shown in FIG. 3. In this embodiment, turbulent flow is induced by virtue of the increased velocity of the through-flow air 53. Accordingly, the surface of the through-flow transfer passage 48 which is in contact with the through-flow air 53 may be free of turbulators 43, as illustrated in FIG. 4.

Figure 4A:
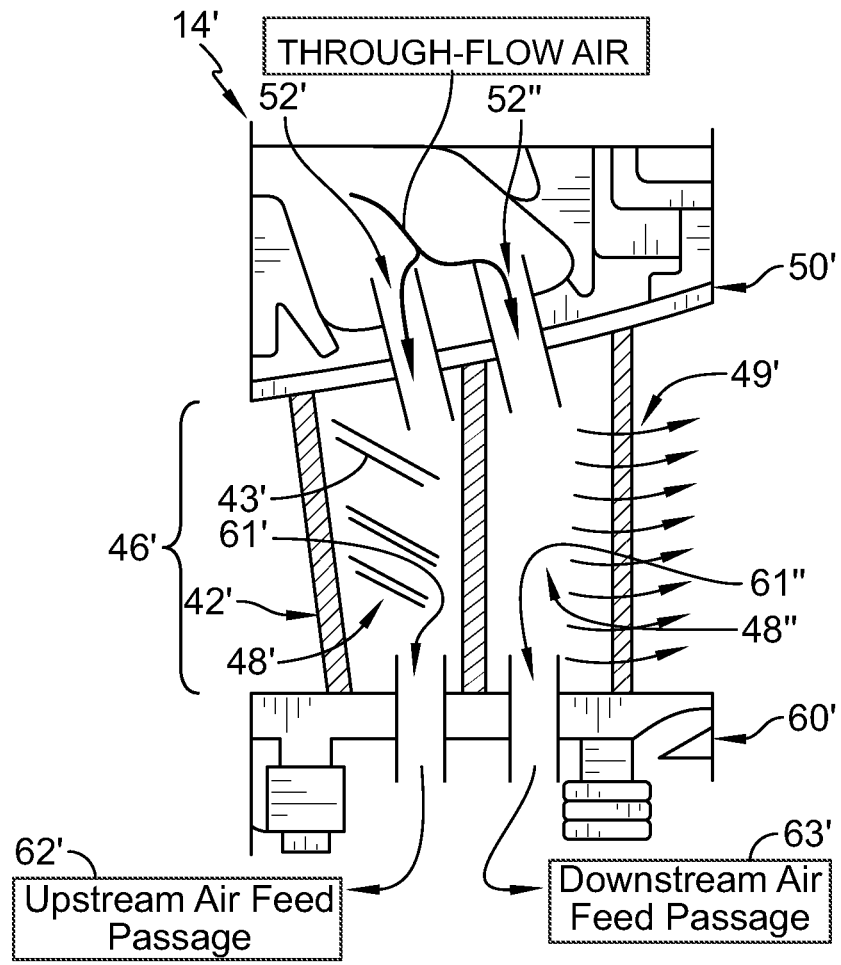
FIG. 4a is a cross-sectional view of the through-flow vane type with the through-flow transfer passage divided into a forward through-flow transfer passage and an aft through-flow transfer passage which allow tailoring the cooling augmentation in each passage to better match the external heat flux on the through-flow vane and/or manage the temperature increase of the through-flow air.

The through-flow transfer passage 48 may be divided into two chambers, a forward through-flow transfer passage 48' and an aft through-flow transfer passage 48" as illustrated in FIG. 4a. The forward through-flow transfer passage 48' may have a corresponding forward through-flow aperture 52' and a forward purge air metering orifice 61' while the aft through-flow transfer passage 48" may have a corresponding aft through-flow aperture 52" and a forward purge air metering orifice 61", each passage with a certain type or density of cooling features and one with a different type or density of cooling features or without cooling features depending on the external heat flux into the through-flow vane 14', as illustrated in FIG. 4a. Optionally, heat transfer augmentation features 43' may be included in either through-flow transfer passage 48', 48" to achieve the desired metal temperature of the through-flow airfoil 42' allowing tailoring of the cooling geometry to achieve the desired vane metal temperature or manage the temperature increase of the through-flow air 53.

The vane ring assembly 10 may be manufactured as a single monolithic structure by the process of investment casting, additive layer manufacturing, subtractive machining, welding, or any combination thereof. Additionally, it may be advantageous to manufacture sections, using the above methods, in either quint, quad, triple, double, or single vane units. Resulting units may be assembled to form a complete vane ring assembly 10 by arranging each manufactured unit of vane type with a frequency achieving the required cooling through-flow air 53 displacement. Sometimes, manufacturing pairs of in-flow vanes 12 and through-flow vanes 14 in separate casting or machining processes is cost effective and should be considered by one of skill—having updated information concerning specific manufacturing capability. Sometimes, manufacturing through-flow vanes 14 integrated with or between in-flow vanes 12 can help manage sealing and/or differences in thermal expansion within the vane ring assembly 10.

The vane ring assembly 10 channels two gas paths. First, the vane ring assembly 10 channels the primary flow path annulus 46 toward turbine blades which are designed to extract energy from the combustion gases. This first gas path ultimately produces the thrust and power gas turbine engines are known for—driving the fan 102, feeding the compressor 104, and thus enabling simultaneous intake, compression, combustion and exhaust. Second, the vane ring assembly 10 internally conducts a radial through-flow air 53 within the through-flow transfer passage 48, into an upstream air feed passage 62 and a downstream air feed passage 63, as illustrated in FIG. 4. This through-flow air 53 is used for cooling turbine blades, other vane ring assemblies 10, internal structures of the rotating components, and to prevent hot gas ingestion from the primary flow path. The through-flow air 53 enables the gas turbine to combust at higher temperatures and operate more efficiently.

Depending on the engine architecture, the through-flow air 53 may become the principal air used to cool rotor wheels and vane ring assemblies 10, as in the present disclosure. A flow path according to this architecture is shown in FIG. 1 and diagrammatically illustrated in FIG. 5. This approach typically results in the through-flow air 53 being divided between two distinct flow passages within a single vane. A standard vane ring assembly is generally constructed of a single vane type, each ducting through-flow air 53 and in-flow air 54 and sealing between the two flow paths. One means of achieving flow separation is by use of an impingement tube 44, as shown in FIG. 3. An impingement tube 44 is often sealed by a weld to the outer band 50 and adjoining to the inner band 60 with a slip fit. As a consequence of dissimilar thermal growth between the impingement tube 44 and adjoining components, leaks occur, which compromise efficiency of air transfer and cooling power of the delivered air.

The current disclosure teaches a vane ring assembly 10 comprising vanes of two distinct types. The first type, and most numerous, are the in-flow vanes 12 which transfer in-flow air 54 through their trailing edges 47 into the primary flow path annulus 46 and cool the associated in-flow airfoil 42, as shown in FIG. 3. A second type, numbering less than the in-flow vanes 12 per vane ring assembly 10, are the through-flow vanes 14. These are dedicated as tubes to deliver cooling through-flow air 53 to the upstream air feed passage 62 and downstream air feed passage 63, a cavity located radially inside the inner band 60, and shown in FIG. 2.

A dedicated through-flow vane 14 can allow the vane to have a high enough flow rate to sufficiently cool itself without the addition of turbulators 43 or at least to cool itself with a simpler cooling geometry than the in-flow vane 12, simplifying manufacturing of each through-flow vane 14. Since the entire through-flow vane 14 is dedicated to ducting through-flow air 53, problematic sealing around impingement tubes is avoided, thus reducing the adverse effects of leakage compromising heat transfer. Without the need for an impingement tube, metering of the through-flow air 53 volume may be achieved by configuration of the through-flow aperture 51. Further, without the complexities of an impingement tube, high-temperature materials used for the trailing edge 47, though unable to be cast into the through-flow vane 14, may be considered for secondary assembly and may eliminate the need for cooling holes 49.

Figure 6:
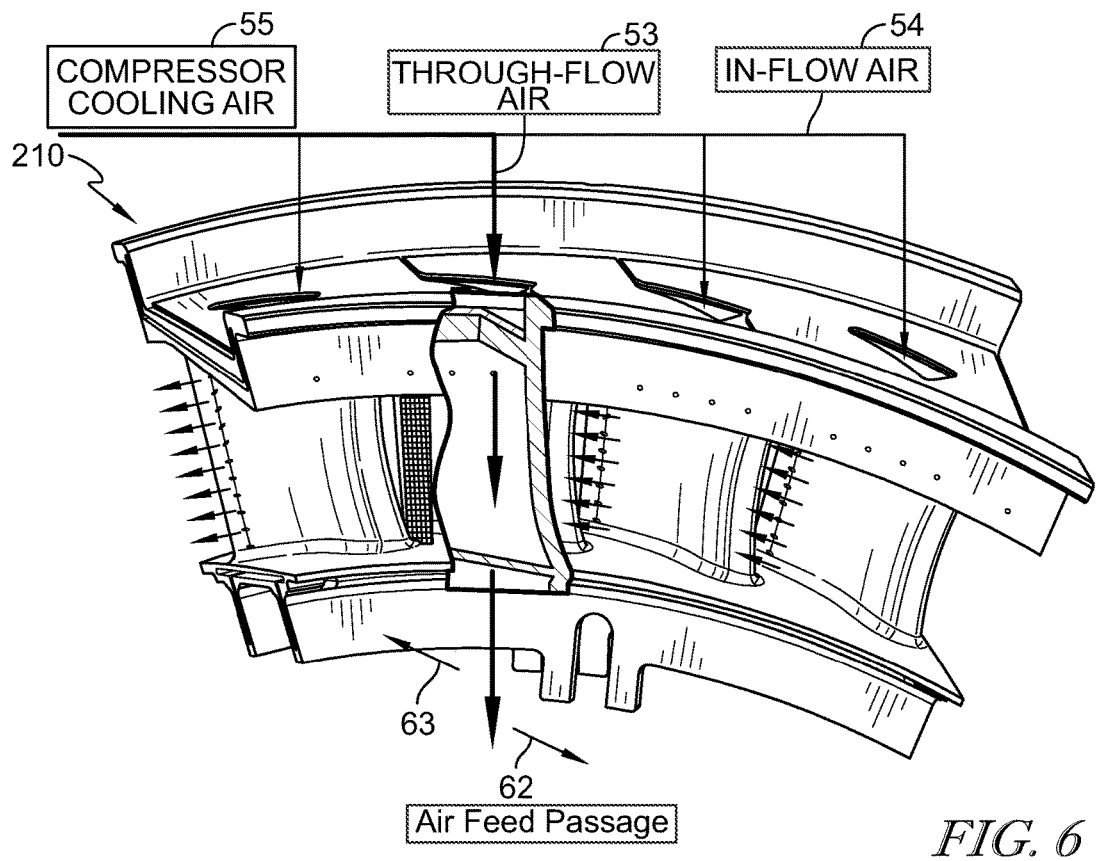
FIG. 6 is a cutaway perspective view of a second vane ring segment adapted for inclusion in the turbine section indicated in FIG. 1 showing that the vane ring segment again includes two distinct vane types: a second embodiment of the through-flow vane, which allows through-flow cooling air to flow through it into the air feed passage without allowing through-flow air to enter the primary flow path annulus, and an in-flow vane, which transmits no flow to the air feed passage, but which ejects in-flow cooling air into the primary flow path annulus.
Figure 7:
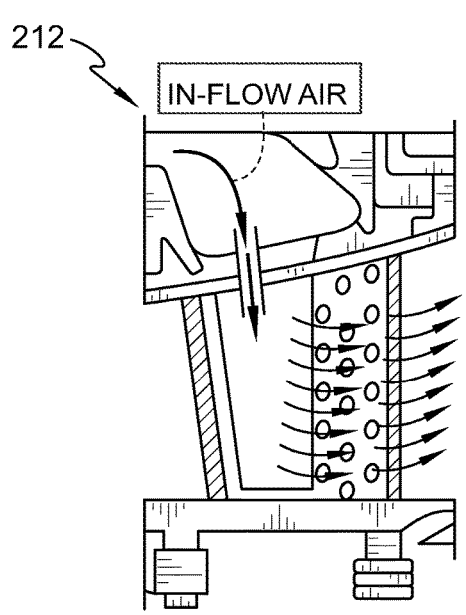
FIG. 7 is a cross-sectional view of a second embodiment of the in-flow vane type depicted in FIG. 3 showing turbulators augmenting heat transfer of in-flow cooling air before ejecting in-flow cooling air only into the primary flow path annulus.

Another illustrative vane ring assembly 10 adapted for use in a gas turbine engine 100 is shown in FIG. 6. A vane ring assembly 210 is substantially similar to the vane ring assembly 10 shown in FIGS. 1-5 and described herein. Accordingly, similar reference numbers in the 200 series indicate features that are common between the vane ring assembly 10 and the vane ring assembly 210. The description of the vane ring assembly 10 is hereby incorporated by reference to apply to the vane ring assembly 210, except in instances when it conflicts with the specific description and drawings of the vane ring assembly 210.

Figure 8:
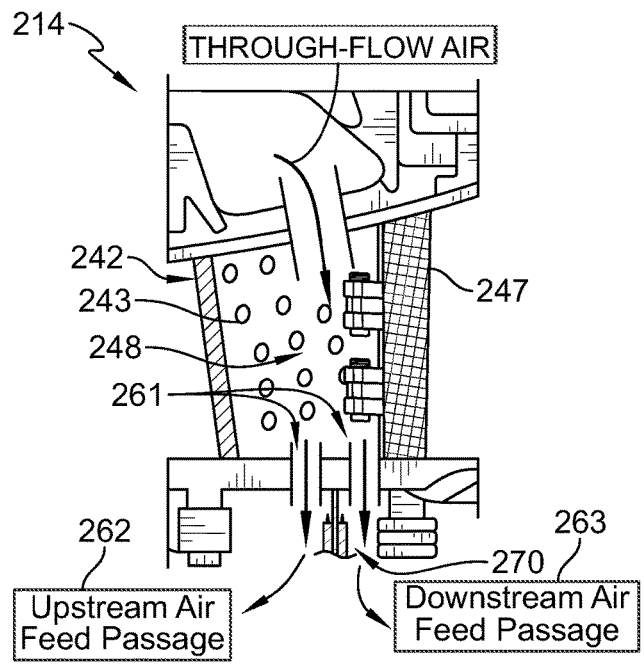
FIG. 8 is a cross-sectional view of a second embodiment of the through-flow vane type shown in FIG. 6, having its trailing edge comprised of a ceramic matrix composite material, showing through-flow cooling air ducted into the through-flow transfer passage without entrance into the primary flow path annulus and final delivery to the feed air passage.

Unlike the vane ring assembly 10, the vane ring assembly 210 includes a trailing edge 247 which is composed of a ceramic matrix composite material. The trailing edge 247 is attached to mounting structures on a through-flow vane 214, as shown in FIG. 8. In this illustrative embodiment the trailing edge 247 has no cooling holes 49, such as those illustrated in the first embodiment of the through-flow vane 14. Increased heat transfer from the additional flow provided by the through-flow air 53 coupled with a high-temperature capability material eliminated the need for cooling of the trailing edge 247.

Unlike the through-flow vane 14, the through-flow vane 214 as illustrated in FIG. 8 suggests optional turbulators 243 disposed on the surface contacting through-flow air 53 to enhance heat transfer. It is suggested in FIG. 8 that a lower density of turbulators (or no turbulators) are required in a through-flow transfer passage 248 than in the in-flow transfer passage 45 illustrated in FIG. 3.

Unlike the purge air metering orifice 61, the purge air metering orifice 261 is comprised of a plurality of orifices, as shown in FIG. 8. It is also suggested that the air exiting the through-flow transfer passage 248 is divided by a flow path barrier 270 which causes one flow to move toward the upstream air feed passage 262 and the other confined to the downstream air feed passage 263, as shown in FIG. 8. The purge air metering orifices 261 are designed to ensure the through-flow air 53 within the through-flow transfer passage 248 circulates to remove heat from surfaces with sufficient uniformity.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A vane ring assembly adapted for use in a gas turbine engine, the vane ring assembly comprising
an airfoil set that extends radially across a primary flow path annulus arranged around a central reference axis, the airfoil set including a plurality of in-flow vanes each having an in-flow transfer passage configured to receive in-flow cooling air from a radially-outwardly opening in-flow aperture and to discharge the cooling air into the primary flow path annulus via cooling holes formed on an exterior surface of the in-flow vanes to cool the in-flow vanes and a plurality of through-flow vanes each having a through-flow transfer passage configured to receive through-flow cooling air from a radially-outwardly opening through-flow aperture and to discharge at least some of the through-flow cooling air radially inwardly of the primary flow path annulus into an air feed passage to cool the through-flow vanes and other components of the gas turbine engine axially forward or aft of the vane ring assembly or to prevent primary hot gas ingestion,
an annular outer band that extends around the airfoil set to define a radially-outer boundary of the primary flow path annulus, the annular outer band formed to define the in-flow apertures from which in-flow internal cavities of the in-flow vanes receive the in-flow cooling air and the through-flow apertures through which through-flow internal cavities of the through-flow vanes receive the through-flow cooling air, wherein the annular outer band is formed to include the in-flow apertures and the through-flow apertures such that the in-flow apertures and the through-flow apertures are in direct fluid communication with the annular outer band, and
an annular inner band that extends around the central reference axis at the airfoil set to define a radially-inner boundary of the primary flow path annulus, the annular inner band shaped to block the in-flow cooling air in the in-flow internal cavities from moving radially-inward of the primary flow path annulus such that all cooling air received by the in-flow internal cavities of the in-flow vanes is discharged into the primary flow path annulus, and the annular inner band formed to define a plurality of purge air metering orifices each located in fluid communication with a corresponding through-flow transfer passage of one of the through-flow vanes and shaped such that at least some of the cooling air received by the through-flow internal cavities of the through-flow vanes is discharged radially-inwardly of the primary flow path annulus for further distribution to the other components upstream or downstream of the vane ring assembly via the plurality of purge air metering orifices such that the cooling air may be re-used to cool the other components or to prevent primary hot gas ingestion after passage through the plurality of through-flow vanes,
wherein the through-flow internal cavity of each through-flow vane is unobstructed in a region enclosed by an internal pressure side, an internal suction side, and the purge air metering orifice such that the through-flow cooling air contacting the internal pressure side and the internal suction side can pass through the purge air metering orifice and cool the other components of the gas turbine engine axially forward or aft of the vane ring assembly.

2. The vane ring assembly of claim 1, wherein each in-flow transfer passage of the in-flow vanes has a plurality of turbulators on a surface contacting the in-flow cooling air configured to cause heat transfer by inducement of turbulent air flow over the surface contacting the in-flow cooling air.

3. The vane ring assembly of claim 2, wherein each through-flow transfer passage of the through-flow vanes are free of turbulators on all surfaces contacting the through-flow cooling air.

4. The vane ring assembly of claim 3, wherein each trailing edge of the through-flow vanes are formed to include cooling holes.

5. The vane ring assembly of claim 1, wherein each trailing edge of the through-flow vanes are formed without cooling holes and at least part of the trailing edges are composed of a solid or hollow first material distinct from a second material forming a remainder of the through-flow vane, the first material able to withstand, without degradation in structure or shape, temperatures in excess of the second material from which the remainder of the through-flow vanes are composed.

6. The vane ring assembly of claim 5, wherein the first material of the trailing edges of the through-flow vanes are formed of a ceramic matrix composite material.

7. The vane ring assembly of claim 1, further comprising a seal located radially inward of the annular inner band and configured to partition an upstream air feed passage in fluid communication with components upstream of the vane ring assembly and a downstream air feed passage in fluid communication with components downstream of the vane ring assembly.

8. The vane ring assembly of claim 1, wherein the plurality of purge air metering orifices on the annular inner band are shaped to distribute through-flow cooling air at preselected levels between an upstream air feed passage and a downstream air feed passage.

9. The vane ring assembly of claim 1, further comprising at least one purge air metering orifice on the annular inner band shaped to regulate volume of through-flow cooling air conducted through the through-flow vanes.

10. The vane ring assembly of claim 1, wherein the plurality of in-flow vanes and the plurality of through-flow vanes are integrated into a one-piece monolithic component.

11. A vane ring assembly adapted for use in a gas turbine engine, the vane ring assembly comprising
a plurality of in-flow vanes that extend radially across a primary flow path annulus arranged around a central reference axis, the plurality of in-flow vanes each having an in-flow transfer passage configured to receive in-flow cooling air from a radially-outwardly opening in-flow aperture and to discharge the cooling air into the primary flow path annulus via cooling holes formed at a trailing edge of the in-flow vanes to cool the in-flow vanes, and
a plurality of through-flow vanes that extend radially across the primary flow path annulus interspersed among the plurality of in-flow vanes around the central reference axis, the plurality of through-flow vanes each having a through-flow transfer passage configured to receive through-flow cooling air from a radially-outwardly opening through-flow aperture and to discharge at least some of the through-flow cooling air radially inwardly of the primary flow path annulus to cool the through-flow vanes and other components of the gas turbine engine axially forward or aft of the vane ring assembly or to prevent primary hot gas ingestion,
wherein a radially-outer boundary of the primary flow path annulus is defined by an annular outer band, and the annular outer band is formed to include the radially-outwardly opening in-flow aperture and the radially-outwardly opening through-flow aperture such that the in-flow aperture and the through-flow aperture are in direct fluid communication with the annular outer band,
wherein an unobstructed annular supply plenum is formed immediately radially outward of the in-flow apertures and the through-flow apertures such that all of the in-flow and through-flow apertures are fed from the unobstructed annular supply plenum.

12. The vane ring assembly of claim 11, wherein each in-flow transfer passage of the in-flow vanes has a plurality of turbulators on a surface contacting the in-flow cooling air configured to cause heat transfer by inducement of turbulent air flow over the surface contacting the in-flow cooling air.

13. The vane ring assembly of claim 12, wherein the through-flow transfer passage of the through-flow vanes have on a surface contacting the through-flow cooling air a plurality of through-flow turbulators, a numerical number of the through-flow turbulators being fewer than a numerical total of turbulators disposed on any surface in contact with the in-flow air within the in-flow transfer passage.

14. The vane ring assembly of claim 12, wherein each through-flow transfer passage of the through-flow vanes are free of turbulators on all surfaces contacting the through-flow cooling air.

15. The vane ring assembly of claim 14, wherein each trailing edge of the through-flow vanes are formed to include cooling holes.

16. The vane ring assembly of claim 11, wherein each trailing edge of the through-flow vanes are formed without cooling holes and at least part of the trailing edges are composed of a solid or hollow first material distinct from a second material forming a remainder of the through-flow vane, the first material able to withstand, without degradation in structure or shape, temperatures in excess of the second material from which the remainder of the through-flow vanes are composed.

17. The vane ring assembly of claim 16, wherein the first material of the trailing edges of the through-flow vanes are formed of a ceramic matrix composite material.

18. The vane ring assembly of claim 11, further comprising one or more purge air metering orifices sized to control air that moves radially inwardly of the primary flow path annulus toward an upstream air feed passage in fluid communication with components upstream of the vane ring assembly and a downstream air feed passage in fluid communication with components downstream of the vane ring assembly.

19. The vane ring assembly of claim 11, wherein the plurality of in-flow vanes and the plurality of through-flow vanes are integrated into a one-piece monolithic component.

* * * * *